Dec. 4, 1934.  J. L. WOODBRIDGE  1,983,507
SPRAYED METAL CASE FOR A STORAGE BATTERY

Filed Nov. 14, 1930

WITNESS:

INVENTOR

Joseph Lester Woodbridge
BY
Augustus B. Stoughton,
ATTORNEY.

Patented Dec. 4, 1934

1,983,507

UNITED STATES PATENT OFFICE 1,983,507

SPRAYED METAL CASE FOR A STORAGE BATTERY

Joseph Lester Woodbridge, Philadelphia, Pa., assignor to The Electric Storage Battery Company, Philadelphia, Pa., a corporation of New Jersey Application November 14, 1930, Serial No. 495,610

2 Claims. (Cl. 136—166)

The subject of my invention is a storage battery assembled in a suitable case of rubber or other acid resisting or insulating material. The outside of the case is coated with a layer of lead or similar metal applied by the spraying process. There is also provided a metallic cover in contact with the layer of metal on the case. The cover and case thus provide a complete metallic shield for the battery to prevent interference with radio reception on a vehicle, such as, for example, an airplane where the battery is used for supplying intermittent current for ignition.

For a further exposition of my invention reference may be had to the annexed drawing and specification at the end whereof my invention will be specifically pointed out and claimed.

Figure 1:
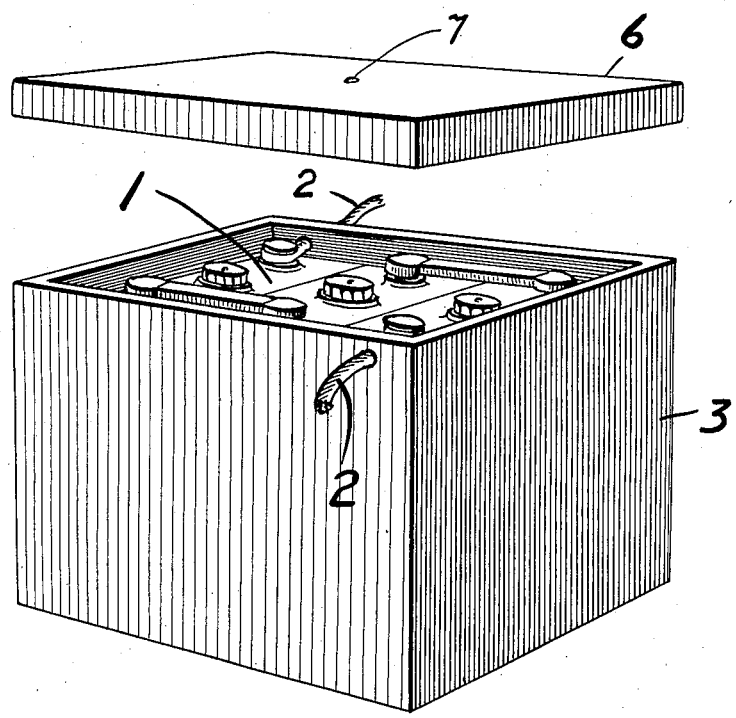
Figure 1 is a view in perspective of the storage battery with the cover removed.
Figure 2:
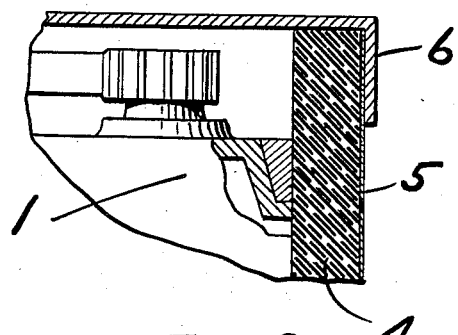
Figure 2 is a detail view in cross section through the cover and case.

In the embodiment of my invention chosen for illustration in the drawing there is shown a storage battery generally indicated at 1 having suitable cables 2 for leading off current from the battery. The battery is contained in a case generally indicated at 3. As is best seen in Figure 2 this case consists of an inner wall 4 of rubber or other acid resisting or insulating material. To the outside of this case there is applied a layer of metal, such as lead or other suitable metal preferably acid resisting. This metal layer is applied to the case by any well known spraying process. The walls of the case 3 extend above the top of the battery above the intercell connectors and the vent plugs and are provided near their upper edges with holes through which the cables 2 are led out.

Because of the height of the side walls of the case 3 there is provided a flat uninterrupted edge to the storage battery case. Over this edge there is adapted to fit a cover 6 which is made of aluminum or other suitable metal, or may be of rubber or similar material coated with a layer of metal as described in connection with the case. This cover has depending flanges which are of sufficient length to contact with the metallic layer 5 on the case 3. If desired, the cover 6 may have a vent 7 therein or the cover may be vented by providing a slight space between the cables 2 and the case 3.

The storage battery is therefore completely surrounded with a metallic shield which serves to prevent interference with the radio reception on the vehicles in which the battery is used to supply intermittent current for ignition. This construction is inexpensive to manufacture and is considerably lighter in weight than the standard construction now used for this purpose and represents an improvement thereover.

The rubber is self-supporting but since the layer is a metal spray deposition it is bonded to the case by a fusion bond, it being remembered that metal is sprayed hot. Again a spray metal deposition is very thin, comparable to foil, and this is indicated in the accompanying drawing, so that a metal spray deposition is incapable of self-support by reason of its thinness, but the fusion bond between it and the rubber insures its support.

I do not intend to be limited in the practice of my invention save as the scope of the prior art and of the attached claims may require.

I claim:

1. An ignition battery having inter-cell connectors and filling plugs and adapted for use on vehicles and shielded to prevent interference with radio reception, having a case extending above the cell connectors and plugs and consisting of rubber material provided on substantially its entire exterior surface with a metal deposition, there being a fusion bond between the rubber and metal and the deposition being devoid of self-support by reason of its thinness.

2. An ignition battery for use on vehicles and shielded to prevent interference with radio reception, having a case of rubber material provided on substantially its entire exterior surface with a metal spray deposition, there being a fusion bond between the rubber and metal, and the deposition being devoid of self-support by reason of its thinness.

JOSEPH LESTER WOODBRIDGE.